July 30, 1968

J. ROSING ET AL 3,394,958

LATCHES

Filed April 29, 1966

Fig_1

Fig_2

INVENTORS.
JOHN ROSING
RICHARD H. FROST
BY

Van Valkenburgh & Lowe

ATTORNEYS

July 30, 1968   J. ROSING ET AL   3,394,958
LATCHES
Filed April 29, 1966   7 Sheets-Sheet 2

INVENTORS.
JOHN ROSING
RICHARD H. FROST
BY
Van Valkenburgh & Lowe
ATTORNEYS

July 30, 1968 — J. ROSING ET AL — 3,394,958

LATCHES

Filed April 29, 1966 — 7 Sheets-Sheet 4

INVENTORS.
JOHN ROSING
RICHARD H. FROST
BY
Van Valkenburgh & Lowe
ATTORNEYS

July 30, 1968     J. ROSING ETAL     3,394,958

LATCHES

Filed April 29, 1966                          7 Sheets-Sheet 5

INVENTORS.
JOHN ROSING
RICHARD H. FROST
BY
Van Valkenburgh & Lowe
ATTORNEYS

United States Patent Office 3,394,958
Patented July 30, 1968

3,394,958
LATCHES
John Rosing, Littleton, and Richard H. Frost, Bow Mar, Colo., assignors to Samsonite Corporation, Denver, Colo., a corporation of Colorado
Filed Apr. 29, 1966, Ser. No. 546,304
10 Claims. (Cl. 292—228)

This invention relates to latches, and more particularly to latch constructions which provide a catch on one component of a structure to engage a socket of another component thereof to interlock the components against movement laterally. More specifically, the invention relates to drawbolts or latches for luggage cases, a primary object of the invention being to provide a novel and improved construction of a latch for a luggage case.

Another object of the invention is to provide a luggage case latch construction of enhanced simplicity, versatility and reliability, which is easily adapted to be used with various types of luggage cases.

Several problems exist in the provision of a uniform type of latch or drawbolt structure for luggage cases because of the varying ways in which the edges of the halves of a luggage case join together, when the case is closed. Basically, a luggage case is usually formed as a rectangular, box-like structure divided into two opposing, hollow halves hinged together along their rear edges, so that they may swing apart to open or together to close. Each half of the luggage case may be formed from a concave shell, such as molded from plastic or formed from metal and covered on the outside with a wear resistant plastic layer, with the edges of the shells attached to a frame strip, such as a metal extrusion bent to shape, and the frame strips adapted to abut or interfit, when the case is closed. Each half of the luggage case may, in another type of construction, be formed of leather or layered wood paneling shaped to a desired form and attached together by outside corner and edge strips, with metal strips covering the exposed edges of each half. Usually, a pair of latches is mounted at the front edge of one half to secure the halves together, when the case is closed, and the latch construction necessarily must accommodate the manner in which the edges of the halves contact each other, when the case is closed. In one common type of luggage case, the edges abut each other; in another type, the edges lap with a lowerer edge extending underneath an upper edge; and in a third type, which has become increasingly popular, the edges form an extended, longitudinal recess and abut together at the base of this recess, this latter type being exemplified in the Willard G. Axtell U.S. Patent No. 2,950,793 of Aug. 30, 1960. Various types of latches are commonly used for cases having lapping edges, such as the construction illustrated in the Atkinson U.S. Patent No. 3,103,115 of Sept. 10, 1963, which shows a catch tongue extending through registering slots of the lapping edges of the case frame, the tongue being carried by a lift lever mounted upon the frame of the upper case half.

The present invention provides an improved latch for cases having abutting frame edges and also for cases having the frame edges abutting together at the bottom of a recess. Also, the invention provides for an improved construction of a latch for cases having lapping frame edges. Accordingly, the invention incorporates improvements in a latch of the type having a base adapted to be mounted upon the edge of a case frame, a lift lever pivotally secured to the base, a resilient toggle between the base and lever adapted to hold the lever only at an up or at a down position, a catch means carried upon the lever and a component mounted upon or within the edge of the opposing case frame having a slot into which the catch means is adapted to move whenever the lever is in its down position.

A further object of the present invention is to provide a novel and improved latch which is easily adapted to be formed either as a flat, rectangular member, as for use with a case where the frame edges abut each other, with the latch necessarily being above the surface of the shells, or as a narrow, comparatively thick member, where the shell edges lap each other and where the latch may also serve as a handle base, or as a narrow, comparatively thick member adapted to fit into a recess at the contacting edges of the frames.

Another object of the invention is to provide a simplified toggle spring construction within a latch which is adapted to effectively hold the lift lever only at an up or at a down position, and which may be further adapted to function as a resilient restraint for a locking attachment within the latch.

Another object of the invention is to provide a novel and improved latch which is formed as a symmetrical unit and thus serves as either a left hand or right hand latch, as where pairs are required, without any modifications or alterations.

Another object of the invention is to provide a novel and improved latch which has a minimum number of individual parts, and in one embodiment incorporates the operative components into formed metal members, and in another embodiment incorporates the operative components into case members, to produce in either embodiment, a simple, rugged and durable unit.

Other objects of the invention are to provide a novel and improved latch construction which is a neat appearing, low cost item especially adapted for manufacture on a mass production basis.

With the foregoing and other objects in view, all of which more fully hereinafter appear, our invention comprises certain constructions, combinations and arrangements of parts and elements as hereinafter described and illustrated in preferred embodiments in the accompanying drawings, in which.

Referring more particularly to FIGS. 1 to 8 of the drawings, the latch there illustrated is not only adapted for use with a luggage case whose sections E and F have edges which are adapted to abut together when the case is closed, but also to be installed in a longitudinal recess provided by the frames. Thus, the latch may be mounted on one half of the case and a catch C on the opposite half of the case, such as on metal frames 20 and 21, respectively, as in FIG. 3. Frame 20 may have a tongue 22 at the edge adapted to interfit with a groove 23 provided on the abutting edge of frame 21. Or, the latch may be installed in a recess formed by inwardly extending walls 24 and 25 of the respective frames, shown in dotted lines in FIG. 3, while a shell formed of suitable material may be attached to each of the frames with the edge of the shell extending beneath an outer flange 26 or 27. When the frames have a cross section similar to that indicated in dotted lines in FIG. 3, catch C conveniently extends through a slot in wall 25. The latch is longitudinally symmetrical to permit the latch to be used as a right hand or left hand unit. It is thus adapted to be mounted upon section E with one longitudinal edge being alongside the section edge to receive and engage catch C having a slot 28 and which outstands beyond the edge of the other case section.

The components of the latch of FIGS. 1-8 include a base B which is attached to the frame of the luggage section E, a lift lever L which is pivotally mounted upon the base and a toggle spring S which is adapted to hold the lift lever at an up position or at a down position. Lift lever L is provided on each side with a depending bolt 29, so that either one may enter slot 28 in catch C, and the same latch may be mounted adjacent either end of the luggage case, since the lift lever is more conveniently operated when its movable end faces the end of the luggage case. When the lift lever L is in its up position, the case may be closed and catch C will move into the latch between the lift lever and the base. When the lift lever is then lowered, the adjacent bolt 29 will move into the catch slot 28 to locking position, all as hereinafter described in detail.

Figure 7:
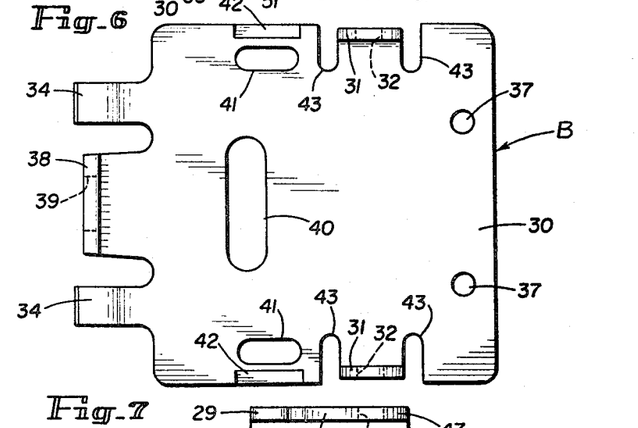
FIG. 7 is a top plan view of a base of the latch.

The base member B, as in FIGS. 1 to 5, and particularly FIG. 7, may be a stamping of moderately heavy gage sheet metal, having portions folded out of the plane of the sheet and rounded slots cut from the edges for special purposes and for facilitating the forming operations. The base B thus consists of a flat, rectangular body 30 having an ear 31 upstanding from both the opposite and adjacent edge of the latch. Each ear 31 is provided with a hole 32 to receive and hold a transversely disposed pin 33 of FIG. 3, on which the lift lever is pivoted, so as to overlie the forward end of the body 30. The front end of body 30 is connnected to the frame 20 by a pair of spaced apart fingers 34 which extend downwardly and outwardly from the forward edge of the body to fit into slots 35, which are provided in the frame 20 for this purpose, as in FIG. 2, and by rivets 36 which fit into suitable holes 37 at the rear end of the body and into registering holes extending through the frame. An arm 38, upstanding from the forward edge of the base and located between the fingers 34, extends upwardly to the underside of the lift lever, as in FIG. 2. A lateral slot 39 is spaced from the upper end of arm 38, to receive an end of the toggle spring S, as described later. A transversely disposed slot 40 is provided at the center of the base to receive a depending abutment of the lift lever L, as described later. Also, a longitudinal slot 41 is provided near each longitudinal edge to receive the lower end of the bolt 29, while an inclined rabbet or groove 42 is formed in the top surface of the body along each longitudinal edge, to guide the catch C into position for engagement with the bolt 29. Also, a slot 43 may extend inwardly from each edge of the base body 30 and at each side of each ear 31, to facilitate forming the ears.

Figure 5:
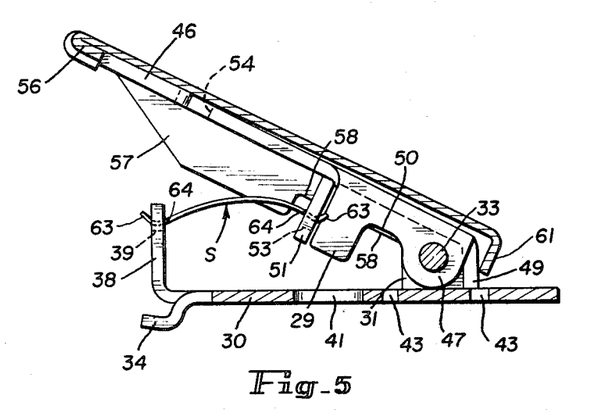
FIG. 5 is a longitudinal section, taken along line 5—5 of FIG. 1, but with the lift lever thereof raised to an open position.
Figure 8:
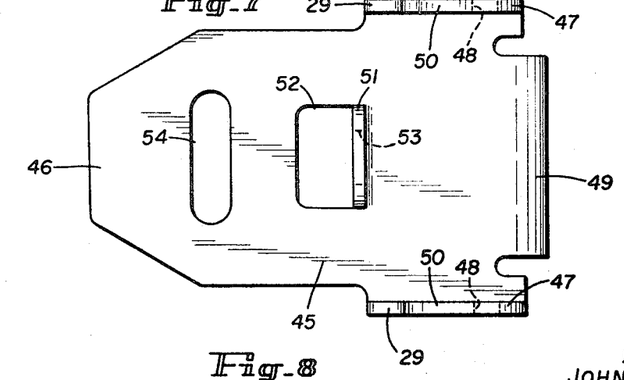
FIG. 8 is a bottom plan view of the lift lever of the latch.

The lift lever L is formed from a stamping similar to the base B, enclosed by a cover 44. The lever stamping, as in FIG. 8, is formed as a flat, substantially rectangular body 45 which is narrower than the base B and has a converging tongue shaped forward end 46. Ears 47 depend from each longitudinal edge of the body near the rear end, being adapted to fit between the base ears 31 and having holes 48 to receive pin 33. The rearward end of the lever is downturned angularly to provide a depending stop flange 49 which is adapted to engage the base 30 when the lift lever is at a fully raised position, as illustrated in FIG. 5.

Figure 2:
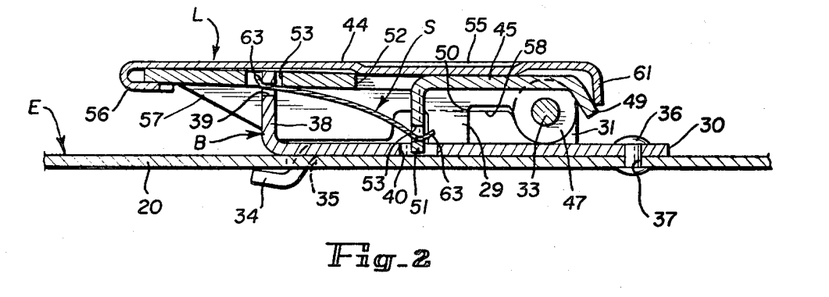
FIG. 2 is an offset longitudinal sectional view, taken through the latch along line 2—2 of FIG. 1.

The lift lever L, as indicated above, has a depending bolt 29 at each side, each bolt 29 being formed as a rectangular, downturned finger lying in the same plane as the ears 47 but forwardly therefrom, while a depending, reinforcing flange 50 connects each bolt 29 and the ear 47, on that side. The lift lever further includes a transverse, depending arm 51 which is cut from a hole 52 in the central portion of the body, as in FIG. 7, and turned downwardly at a position approximately half way between the arm 38 of base B and the pin 33, the lower end of arm 51 being received in slot 40 of the base when the lever is lowered. A lateral slot 53 is spaced from the lower end of arm 51, to receive the opposite end of the toggle spring S. The lift lever stamping also has a transverse slot 54 near its forward end to receive the upper end of the base arm 38 when the lever is closed, as illustrated in FIG. 2.

The lift lever stamping 45, as indicated above, is enclosed by the cover 44, which may be formed of a lighter gage sheet metal than the lever stamping and which is preferably finished on its outer surface, as by plating and design configurations 55. Cover 44 is approximately rectangular and is wider than the lever to cover the base B whenever the lever is down. The front edge of the cover may be squared or preferably rounded, as shown, and is folded under the forward end 46 of the lever stamping, as in FIG. 2, as a flange 56, which is also tightly folded against itself at each side of the lever end 46 to a secure position, as in FIG. 5. Each longitudinal side edge of the cover is downfolded to provide a wall enclosure or side flange 57 at each side of the latch, with an upward offset 58 to accommodate catch C and a rear ear 59 having a hole corresponding to hole 32 in ear 31 of base B to receive pin 33, the outer ends 60 of pin 33 being riveted against cover ears 59, as in FIG. 1. An angular, depending front flange 61 of the cover extends over abutment 49 of the lift lever body, as in FIGS. 2 and 5. With the arrangement thus described, the cover 44 neatly and tightly embraces the lift lever.

The toggle spring S is formed as a thin, flat member having a uniform, ribbon-like body, with a narrow angular flange 63 at each end, and a shoulder 64 at each side thereof. The angular flanges 63 of the spring are adapted to fit into the slots 39 and 52, respectively, with the shoulders 64 bearing against the respective arms 38 and 51. The length of the spring between the shoulders 64 is greater than the spacing between the arm slots 39 and 52, so that when the spring is placed in position, it will be arched to exert compression between the arms at all times, as illustrated.

Figure 6:
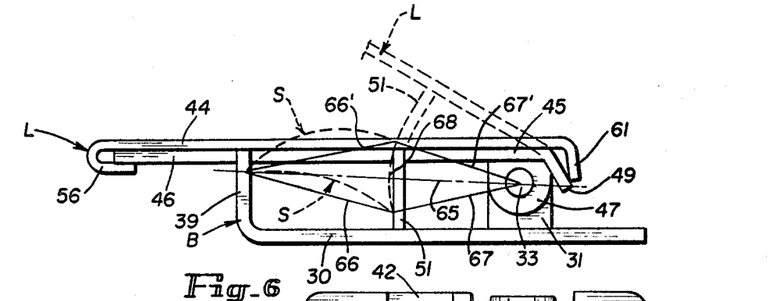
FIG. 6 is a diagram including a phantom sectional view of the latch similar to FIG. 2, with broken lines indicating the raised position of the lift lever, an arcuate segment line indicating the path of movement of the connecting point between the spring and lift lever, and opposed lines provided with arrows drawn between the pivot point of the lift lever and the fixed end of the toggle spring, respectively, and the connecting point between the spring and lift lever, in both the down and raised positions of the lift lever.

The diagram of FIG. 6 includes, in phantom outline, the base B, which is fixed, the lift lever L, shown in down position in full lines and in up or lifted position in dotted lines, and the spring S, indicated by dotted lines in its two positions corresponding to the positions of lift lever L. A centerline 65 extends between the fixed points at rear shoulders of spring S at arm 39 and the center of pin 33, while arrow lines 66 and 66' extend between the shoulders of spring S when in the down and up positions, respectively. Arrow lines 67 and 67' extend between the center pin 33 and the front shoulders of spring S in corresponding positions, with arc 68 indicating the path of movement. It is to be noted that the positions of the slots in arms 38 and 51, respectively, where the shoulders of the springs engage the respective arms, is such that an extension of line 66 will pass to the underside of the shaft 33, when the lift lever is at the down position, and that an extension of line 66' will pass on the upper side of shaft 33, i.e., when the lift lever is raised. Since the path 68 of the slot in lever arm 51 is arcuate but convex toward the spring S, it follows that the shortest distance between the opposite ends of the spring is at centerline 65. Accordingly, the compressive effect of the spring, tending to spread its end points apart, is effective to urge the lift lever to either position shown, as soon as the inner end of the spring crosses centerline 65. As a result, the lift lever will snap between an up or open position and to a down or closed position, but will not remain at any intermediate position. The strength of the spring, which may be selected as desired, will govern the force of the snap action.

Figure 1:
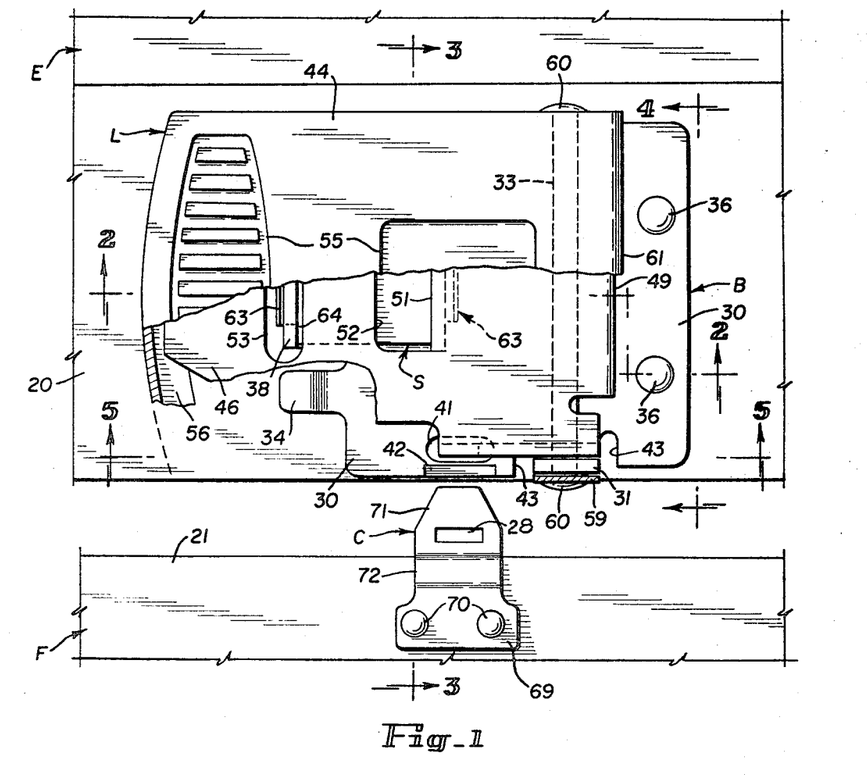
FIG. 1 is a top plan view of a first form of latch of this invention, showing a portion of the luggage case halves on which the latch is mounted and the luggage case partly open, with dotted lines indicating parts within the latch and with the latch cover being broken away to show constructions otherwise hidden from view, the outline of the cover being indicated in dashed lines.
Figure 3:
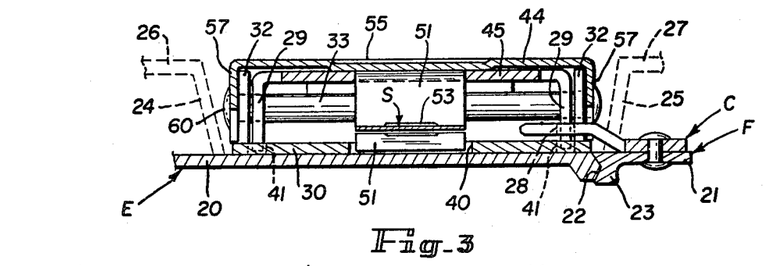
FIG. 3 is a transverse section, taken along line 3—3 of FIG. 1, but showing the catch and latch interengaged, as when the luggage case is closed, and another type of frame on which the latch may be installed indicated in dotted lines.
Figure 4:
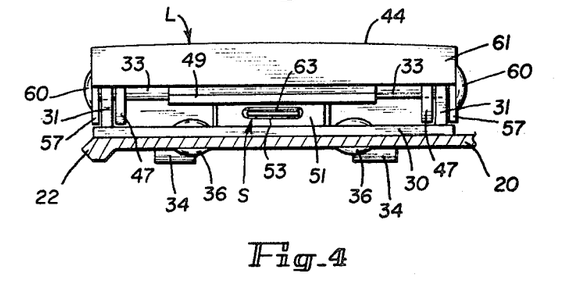
FIG. 4 is a transverse section, taken along line 4—4 of FIG. 1 and showing an end view of the latch.

The catch C, as in FIGS. 1 and 3, is formed as a simple, tongue-like member having a base 69 which is attached by rivets 70 to the case section, as on frame 21, or base 69 may be mounted on the underside of frame 21. Catch C also has a tapered edged tongue 71 in which slot 28 is formed and connected to base 69 by an offset 72, to provide clearance for the thickness of the base of the latch when the luggage case is closed and the tongue 71 overlies the base B, as in the manner illustrated in FIG. 3. Offset 72 may be omitted when frames similar to those shown in dotted lines in FIG. 3 are utilized, since catch C can extend directly through a slot in wall 25, as indicated previously. Of course, suitable provision should be made for mounting catch C on wall 25 or on a flange extending laterally from the wall. As will be evident, if the edge of case section F is accidentally depressed while closing, the end of tongue 71 will be guided upwardly onto base B by groove 42 of FIG. 7. In the closed position, the lower end of bolt 29 extends into slot 41 in base B, so that any force tending to open the luggage case will be resisted not only by the bolt 29, as a part of lift lever L, but also will merely pull the lower end of bolt 29 against the outer edge of slot 41. Thus, a resistant force is provided both above and below the catch, which is thereby securely held in position.

Figure 9:
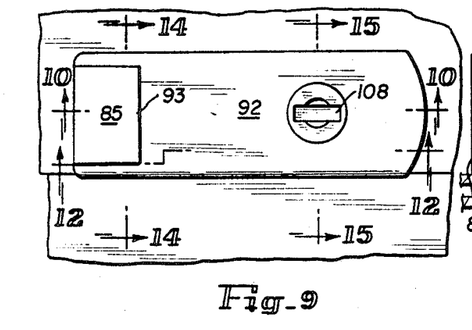
FIG. 9 is a fragmentary top plan view of a limited portion of the top of a luggage case having frames with lapping edges, and illustrating a second form of a latch of this invention.
Figure 10:
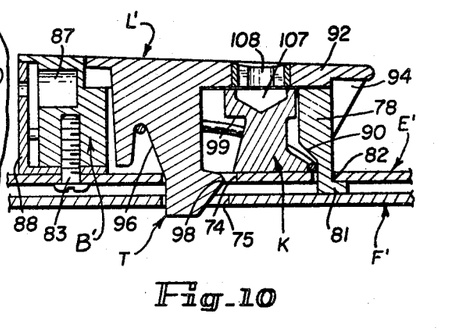
FIG. 10 is a central longitudinal section, taken along line 10—10 of FIG. 9.

A second construction of a drawbolt or latch embodying certain principles of the invention is illustrated in FIGS. 9 to 21. This latch is especially adapted to be used with luggage cases having case sections E' and F', the edges of which overlap, the edge of the section E', on which the latch is mounted, overlapping the edge of the section F', as illustrated in FIGS. 9 and 10. Accordingly, a single bolt or tongue T, at the center of the latch, is adapted to drop into registering slots 74 and 75 in the lapped edges.

The edges of the sections E' and F' may be frames which are generally flat, or may be provided with a longitudinal recess in which each latch is installed. A pair of such latches, spaced longitudinally, may also be adapted to provide a support for a handle H, having a rod 76 extending through the handle and projecting outwardly at each end. The latch includes a base B', a lift lever L' pivotally mounted upon the base and with the tongue T depending from the underside of the lift lever to extend through the base and into the slots 74 and 75 when the lift lever is lowered to locking position, and a toggle spring S' adapted to hold the lift lever at an up or at a down position. This latch also includes a lock K which is mounted within the base, at its front end adjacent to the tongue T. Lock K is adapted to be turned to one position to engage and lock the bolt when it is down, as in FIG. 12, or to be turned to the opposite position to permit the tongue to be moved upwardly when the case is to be opened, but will again engage the tongue, as in FIG. 11, to restrict its upward movement. Lock K also holds one end of spring S' against base B, in either position of lift lever L, and further is maintained by the spring S' in either position to which it is turned, in a manner described later. Each of lift lever L', base B' and lock K are conveniently formed by casting a suitable material, the die casting zinc alloy known as Zamac being suitable, although other metals or alloys suitable for die casting may be utilized.

Figures 18, 19:
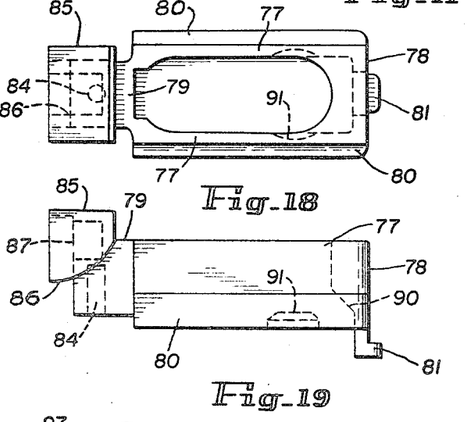
FIG. 18 is a top plan view of a base of the latch of FIG. 9.
FIG. 19 is a side elevation of the base illustrated in FIG. 18.
Figure 20:
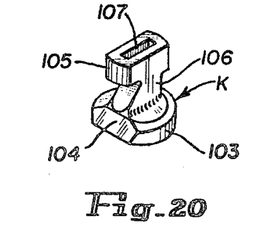
FIG. 20 is a perspective view of a locking head of the latch illustrated in FIG. 9.

The base B', illustrated in FIGS. 10 to 15 with other components, and per se in FIGS. 18 and 19, has the general shape of a longitudinally symmetrical box-like shell which is open at the top and at the bottom. The base thus has upstanding longitudinal side walls 77 and upstanding, transverse end walls 78 and 79, respectively, while longitudinally disposed flanges 80 outstand from the base at the lower edge of each side wall, as in FIG. 14, and the lower edge of end wall 78 is provided with a depending, angular ear or hook 81 which will engage a slot 82 in case section E', as in FIG. 10, to secure that end of the latch to the case section. The opposite end of the latch is attached to the case section by a screw 83, which may be self-tapping and form its own threads in a hole 84 extending upwardly into front wall or block 79, as in FIG. 19.

End wall 79, which is longitudinally elongated but is narrower than the spacing between the side walls 72, is provided at its upper corner with an upstanding block 85 which extends laterally beyond end wall 79 and which has an arcuate segment 86 forming a bearing surface on the underside for the lift lever L', which interfits therewith in a manner described below. A socket 87 for handle rod 76 extends inwardly from the end of block 85, while the handle is secured, as in FIG. 11, by an angle 88 to the upright leg of which handle rod 76 is pivotally attached, as by inserting in a hole in the angle and then upsetting to produce a bump or offset 89, with a washer, as shown, between the bump and angle. With the handle attached to angle 88, the latter may readily be held in position by screw 83, which clamps base B' against the base leg of angle 76.

Figure 11:
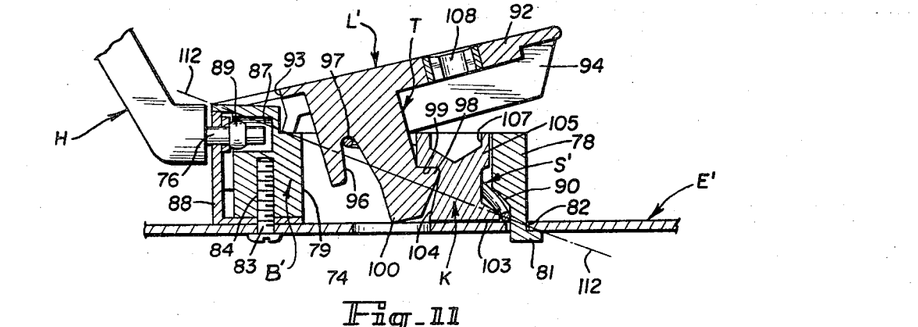
FIG. 11 is a longitudinal section, similar to FIG. 10, but illustrating a latch cover in a lifted position, as when the case is open.
Figure 12:
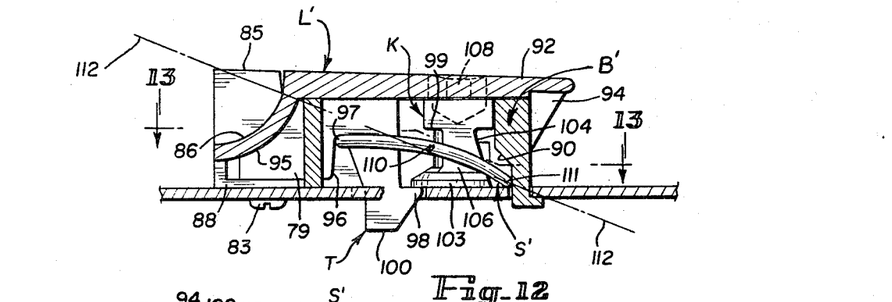
FIG. 12 is an offset longitudinal section, taken along line 12—12 of FIG. 9.
Figures 14, 16:
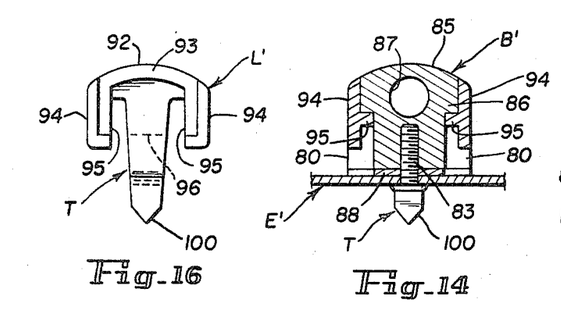
FIG. 14 is a transverse section, taken along line 14—14 of FIG. 9.
FIG. 16 is a left end elevation of the cover or lift lever.
Figure 15:
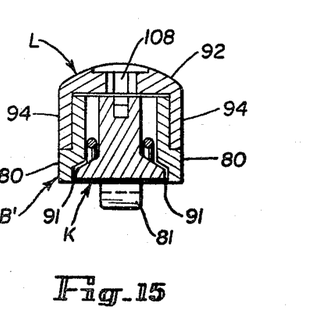
FIG. 15 is a transverse section, taken along line 15—15 of FIG. 9.

To acommodate lock K and spring S', the inside of end wall 78 is undercut at 90, as in FIGS. 11, 12 and 19, while the inside of each side wall 77 is provided with an arcuate groove 91 having a tapered top, as in FIGS. 16, 18 and 19, to accommodate rotation of lock K.

Figure 17:
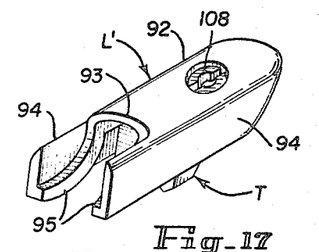
FIG. 17 is a perspective view of the cover or lift lever.

The lift lever L', illustrated in FIGS. 9 to 15 with other components, and per se in FIGS. 16 and 17, is formed as an elongated, inverted U-shaped member, having a top 92 adapted to cover the top of the base B', except for a notch 93 which accommodates block 85. Depending sides 94 are adapted to embrace the sides 77 of the base, above the longitudinal flanges 80 and with the bottom edges of the sides 94 engaging the tops of the flanges 80 when the lift lever is lowered, as in FIG. 16. At the position of notch 93, an arcuate bearing segment 95 is provided on the inner wall of each side 94, with the upper edge of each segment 95 bearing against the lower edge of the corresponding segment 86 of block 85 and sides 94 embracing the sides of block 85. As will be evident from FIG. 12, pivotal movement of lever L' is permitted by the sliding of the concave tops of segments 95 on the convex undersides of segments 86, while the lift lever segments 95 are pressed against the base segments 86 by spring S', in a manner explained below.

The top and opposite end of the lift lever L' are rounded, as well as the upper edges of sides 94 to provide a neat appearance. The length of the lever is such that the end of the top overhangs the end wall 78 of the base B', as in FIG. 10, to facilitate gripping and lifting the lever, as with the tip of a finger.

Figure 13:
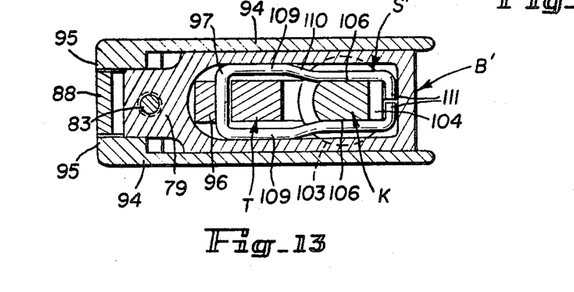
FIG. 13 is an offset section, taken along line 113—13 of FIG. 12.

The bolt T depends from the underside of the top 92 of the lift lever, being generally rectangular in cross section, as in FIG. 13, to lie within and to extend downwardly through the space between the side walls of base B' and into slots 74 and 75 in the case sections when the lift lever is lowered. When the lift lever is raised, bolt T extends only within the base. Adjacent end wall 79, bolt T is provided with an upwardly extending and tapering notch 96, in the upper end of which one end 97 of spring S' is received, while adjacent lock K, the bolt is provided with an outstanding, angular shoulder 98 which is adapted to engage an abutment 99 in one side of the lock when the lever is raised to the open position, as in FIG. 11, and to engage the bottom of the lock K when the lift lever L' is lowered, as in FIG. 12, and the lock K is turned to its locking position.

The extreme lower end 100 of bolt T may be wedge shaped laterally, as in FIG. 16, to draw the case sections together upon entering slot 75.

The lock K is formed as an upstanding, spool-shaped member having a base flange 103 which is beveled inwardly on the top and is circular except for a flat 104 which slants upwardly and inwardly to abutment 99, to provide clearance for shoulder 98 of bolt T. Base flange 103 of the lock is adapted to fit and rotate in the side grooves 91 in the base. A head 105 at the upper end of the lock has arcuate ends and opposing flat sides 106, which extend down to the base flange, while a slotted socket 107 is cut into the top to receive a key to rotate the lock from a locking position to an opening position and vice versa by a 180 degree turn. A rotatable bezel 108 having a key slot, as in FIGS. 10–12, is mounted in the top of lever L directly over the lock K, to permit a key to be inserted therein for engaging socket 107 and turning the lock K.

Figure 21:
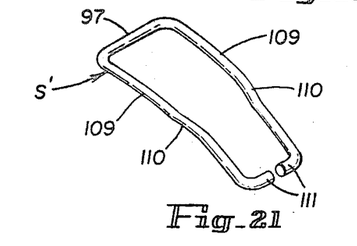
FIG. 21 is a perspective view of a toggle spring of the latch of FIG. 9.
Figure 22:
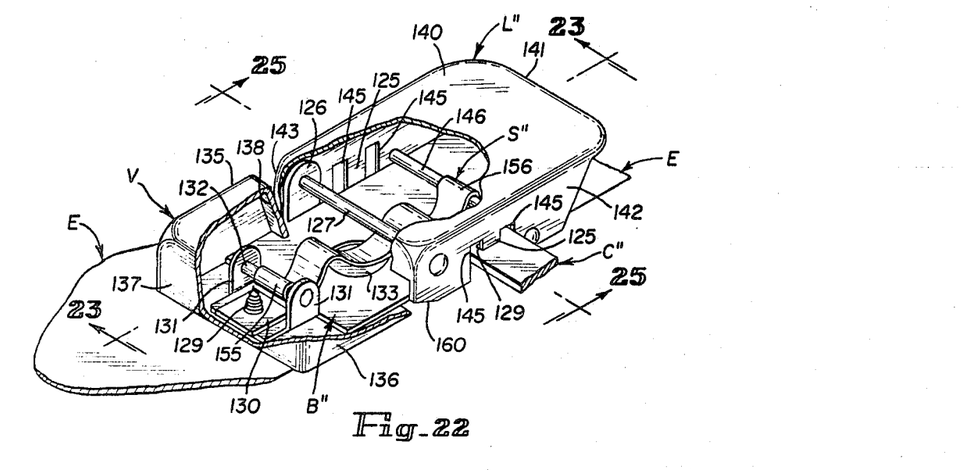
FIG. 22 is an isometric view of a third form of a drawbolt or latch of this invention, with top portions of the latch being removed to show parts otherwise hidden from view, and showing a fragmentary portion of a frame on which the latch is mounted and a portion of catch, which is affixed to the other half of the luggage case, not shown, but is engaged with the latch.
Figure 23:
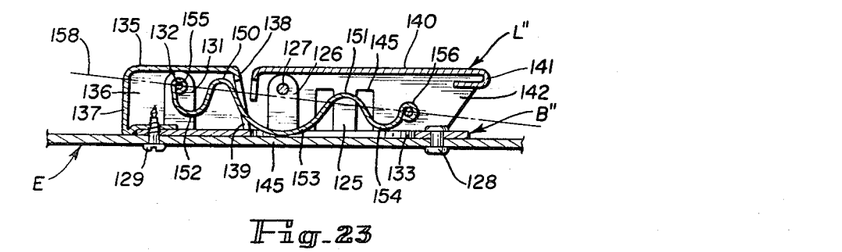
FIG. 23 is a longitudinal section, taken along line 23—23 of FIG. 22.
Figure 24:
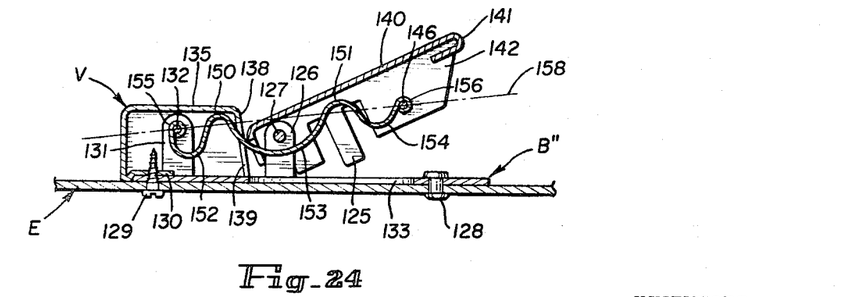
FIG. 24 is a longitudinal section, similar to FIG. 23, but with the lift lever of the latch raised to a releasing position.

The spring S', as in FIG. 21, is formed as a longitudinally convex, rectangular loop of resilient spring wire having a wider inner end 97, sides 109 having an inward offset 110 and a narrower end 111, which is split. This loop is proportioned to lie within side walls 97 of the base, with the narrow end 111 being anchored beneath undercut 90 by bottom flange 103 of the lock and the opposite end 97 being anchored in the upper end of notch 96. The spring ends remain anchored because the spring S' is compressed from each end toward the center, in both the raised and lowered positions of FIGS. 11 and 12, respectively, to maintain the lift lever in either position and will snap the lever to a different position whenever the lever is moved past the pivot axis or centerline 112 between the narrow end of the spring and the center of the arcuate segments 86 and 95, at the upper corner of block 85, as indicated in FIG. 12. It is to be noted that a line between the ends of the spring will be below the pivot axis when the lift lever is lowered, as in FIG. 12, and above the pivot axis when the lift lever is raised, as in FIG. 11. It will further be noted that the upper end of notch 96, in which end 97 of the spring is located, will move in an arc having a center at the center of arcuate segments 86 and 95, so that the minimum distance between the ends of the toggle spring is at the point where this arc intersects the pivot axis. Thus, the compressive action of the toggle spring tends to move the lift lever either upwardly or downwardly to the fully raised or fully lowered position. Also, bottom flange 103 of lock K will prevent the end 97 of the spring from moving downwardly in notch 96, in addition to the friction produced through the pressure of the spring, when the lift lever is in the down position.

A further and important function of spring S' is to maintain lock K in either position to which it is shifted by the key. Adjacent the narrower end 104, sides 103 are initially formed a distance apart corresponding to or slightly less than the distance between the flat sides 106 of lock K so that, as in FIG. 13, the narrow end of the spring will press against these flat sides. When the lock is turned to the opposite position, the split in end 104 will permit the sides to be spread apart, during turning, but the spring sides will again press against the flat sides 106, but 180 degrees from the previous position. As indicated above, in locking position, shoulder 98 of bolt T is locked under the base flange 103, preventing any lifting of the lever L', as clearly illustrated at FIG. 12. In the open position, abutment 99 of lock K is engaged by shoulder 98 of the bolt, to prevent any further upward movement of the lift lever, even though urged upwardly by spring S'.

Figure 27:
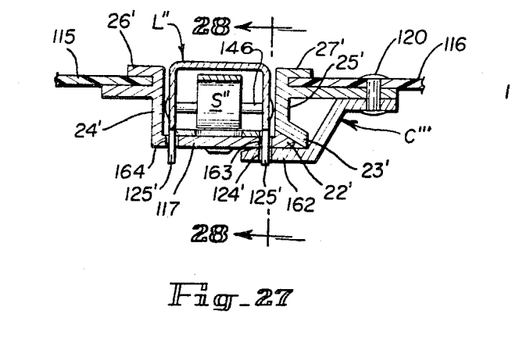
FIG. 27 is a transverse section, similar to FIG. 25, but illustrating the latch as modified for use in a narrower recess and with a catch mounted in a different manner.
Figure 28:
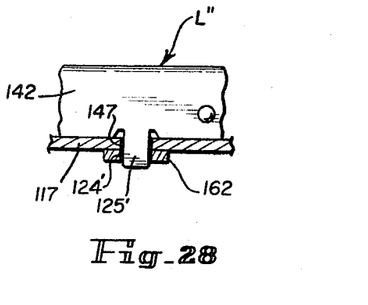
FIG. 28 is a side elevation of the latch and a section of the catch, taken along line 28—28 of FIG. 27.

A third construction of a latch is illustrated in FIGS. 22 to 26 and slight modifications of this construction are illustrated in FIGS. 27 and 28. This latch is similar in certain respects to the latch illustrated in FIG. 1, and it may be mounted upon the case sections the same as that unit, such as on a frame section E, as in FIGS. 22–24, or, as in FIG. 25, in a recess formed between frame strips to which the edges of shells 115 and 116, respectively, are attached. Thus, one frame strip may be provided with a laterally extending flange 117 which forms the bottom of the recess and is provided with a tongue 22' adapted to engage a groove 23' of the opposite frame strip, the latter being formed at the lower edge of an upright flange 25' which forms one wall of the recess, while flange 117 extends laterally from an upright flange 24' which forms the other wall of the recess. Flanges 26' and 27', beneath which the edges of the respective shells 115 and 116 are received, extend outwardly from the upper edges of walls 24' and 25', respectively, while each frame strip may further be provided with an intermediate flange 118 and 119, respectively, spaced from the respective flanges 26' and 27' a distance to accommodate the shell edge and to which the shells are secured, as by a peripherally spaced series of rivets 120. A catch C" extends laterally from the opposite case section, being mounted thereon as in FIG. 1, to engage the latch bolt, in the manner illustrated in FIG. 22. Catch C" may also be merely a straight piece of metal, as in FIG. 25, attached to the underside of flange 119, as by a rivet 120, and extending through a slot 121 in wall 25', the catch being provided with a slot 124 adjacent its outer end to receive a depending bolt 125 of the latch.

Figure 25:
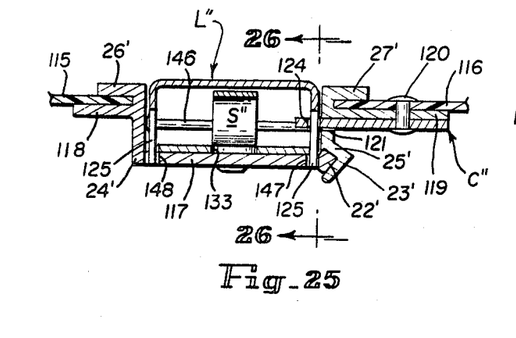
FIG. 25 is a transverse section, as taken from the line 25—25 of FIG. 22, but showing the latch installed in one type of frame.
Figure 26:
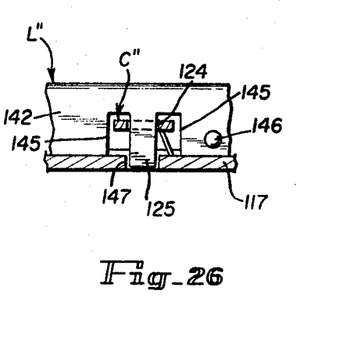
FIG. 26 is a side elevation of the latch and a section of the catch, taken along line 26—26 of FIG. 25.

The latch of FIGS. 22 to 26 comprises a base plate B" mounted upon the case section or the floor of the recess of FIG. 25; a lift lever L" pivotally attached to the base plate B" to overlap a portion thereof and having a bolt 125 at each side, to provide an interchangeable unit, i.e. either right or left hand; a cover V for the inner end of the base plate; and a special toggle spring S" adapted to hold the lift lever in an up position to receive or release the catch C" and in a down position to engage the catch and lock the case.

The base plate B" is formed as a stamping of moderately heavy gage sheet metal, having certain portions folded out of the plane of the sheet and holes and slots for facilitating forming operations and for special purposes, as described below. The base plate is slightly narrower than the width of the space in which the latch is to be mounted, to provide lateral clearance for the overlapping lift lever L". A pair of ears 126 upstand from the side edges, at a central portion, and are provided with holes to receive and hold a transversely disposed shaft 127 on which the lift lever L" is pivotally mounted to overlie the outer end of the base plate. The latter is attached to the case section by a central rivet 128 adjacent the outer end which extends through aligned holes in the base plate and case section, and at the inner end by a screw 129, such as a self-tapping screw, which extends through a hole in the case section and taps into a hole in the plate to upstand therefrom. Screw 129 also taps into a corresponding hole in a lower flange 130 of cover V, or into the latter hole alone, to hold the cover in position, as well as the base plate. A support for one end of spring S" is located at the front end of the base plate and is formed as a pair of upstanding ears 131, turned out of the plane of the base plate and provided with holes for receiving a transverse pin 132, the distance between ears 131 being greater than the width of toggle spring S", but less than between ears 126. To complete this base, a longitudinally elongated slot 133 is provided at the center of the base plate to provide clearance for the toggle spring when in down position, as in FIG. 23. The front portion of the base plate is enclosed by cover V, which is formed as an inverted box-like shell having a top 135, depending sides 136 and a depending front 137, with rounded edges between the top and the sides and front. Flange 130 is connected to or integral with the lower edge of front 137, so as to be hidden, while the rear 138 of the cover is slanted away from lift lever L" to accommodate pivotal movement of the latter, as in FIG. 24, and is also provided with slot 139 to clear spring S".

The lift lever L" is formed as a stamping of material similar to the base plate, and as a substantially rectangular shell having a rounded top 140 whose outer edge 141 is curved, rounded and turned under to provide a convenient finger gripping edge for lifting the lever. Downturned, depending side walls 142 are provided with holes at the inner end to receive the ends of the shaft 127 to mount the lever upon the base plate, with the ends of the shaft 127 being riveted against the respective side wall 142, or secured against displacement in any other suitable manner. The inner end of the lever, adjacent to the cover V, is formed as a downturned flange 143 having a shallow central notch, as shown, to clear spring S", and is adapted to rigidify, as well as enhance the appearance of the unit. A bolt 125 is formed in each downturned side wall 142, each bolt being defined by notches 145 at each side thereof, as in FIG. 26. To complete the lift lever, a transversely disposed pin 146 is mounted, as in the position of FIG. 23, upon and between the side walls 142, to hold an end of the toggle spring S", and extending through appropriate holes in the side walls and having its ends riveted against the side wall, as in FIG. 22. As will be evident, lift lever L" may pivot upwardly and downwardly on shaft 127 and carry pin 146 with it during such movement. In the down position, as in FIGS. 25 and 26, bolt 125 preferably not only extends through slot 124 in catch C", but also into a slot 147 in flange 117, to anchor the lower end of bolt 130, thus providing maximum resistance to forces tending to open the luggage case. A slot 148 in flange 117, at the opposite side of the latch, accommodates the bolt 125 not in use.

Toggle spring S" is formed of leaf spring material and as a continuous ribbon convoluted to a modified sinusoidal form, such as several complete wave forms or including crests 150, 151 and troughs 152, 153 and 154. Each end of toggle spring S" is rolled to provide a transverse socket 155 and 156 which surround pins 132 and 146, respectively, to connect the opposite sides of the spring to the base and lift lever, respectively. The spring is formed and proportioned to exert a substantial tension action between its mounting pins 132 and 146, and these pins are oriented with respect to the lift lever mounting shaft 127, so that a line 158 between the pins will pass below the shaft 127 whenever the lift lever is in the down position, as in FIG. 23, but above the shaft 127 whenever the lift lever is in the up position, as in FIG. 24. This arrangement provides an effective toggle action, causing the lift lever L" to move to either its full up position or to its down position, the same as heretofore described. Moreover, the convoluted form of the spring provides an effective resilient tension action, and the troughs and valleys of the spring provide effective clearances within the latch, the trough 153 particularly permitting the spring to clear the central shaft 127, as in the manner illustrated in FIG. 24, with the lever in up position. The approximate radius of each trough and crest may be varied. Thus, the end troughs 152 and 154 may have a lesser approximate radius than the central trough 153, so that the latter will clear the front edge of the lift lever, when the lift lever is in up position. The crests 150 and 151 may have the least approximate radii, to clear the underside of cover top 135 and lift lever top 140, when the lift lever is up. It will be noted that, when the lift lever is raised, its upward movement is limited by an angular lower front corner 160 of each side wall 142 which acts as a stop by engaging the case section E, such as the lateral frame strip flange 117 of FIG. 25. Of course, a stop to limit the upward movement of the lift lever may be provided in any other suitable manner.

In the modification illustrated in FIGS. 27 and 28, a catch C''' is angular, so as to extend downwardly from flange 116 of one frame strip to a tongue 162 having a slot 124' and fitting underneath lateral flange 117 of the opposite frame strip. Each bolt 125' depends downwardly further than bolt 125 of FIG. 25, so that the bolt in use will project through a slot 163 in flange 117 and directly into slot 124'. Thus, a pull on catch tongue 161 will be directly resisted by flange 117, thereby reducing or eliminating the possibility of bending the bolt. This construction also permits the notches 145 at each side of the bolt in FIG. 26 to be eliminated or reduced to a vestigial form, as shown in FIG. 28. A slot 164 in flange 117 accommodates the opposite bolt 125', while the underside of tongue 22' of flange 117 and groove 23' may be notched to accommodate catch tongue 162.

We have now described our invention in considerable detail; however, it is obvious that others skilled in the art can build and devise alternate and equivalent constructions which are nevertheless within the spirit and scope of this invention.

We claim:
1. A latch for a luggage case or the like formed as two sections adapted to close together, said latch being mounted upon one section to engage a catch on the other section when the case is closed, and wherein said latch comprises:
   a base secured to said one section and having a longitudinal edge thereof adjacent to the edge of said section;
   transverse pivot means carried by said base;
   a lift lever mounted upon said pivot means to overlie a portion of said base and being adapted to be raised above said base to an upper position and to be lowered toward said base to a lower position;
   a latching bolt carried by said lift lever, depending therefrom towards said base and adapted to engage said catch when the case is closed and the lift lever is lowered toward said base to its lower position and to be disengaged from said catch when the lift lever is raised;
   a rotatable lock mounted in said base for locking said lift lever in down position, said lock having opposed flat sides;
   a spring mounted between said lift lever and said base, said spring being generally rectangular in form;
   mounting means on said base engaging one end of said spring, with the sides of said spring engaging said flat sides of said lock to hold said lock in either of two opposite positions; and
   mounting means on said lift lever engaging the other end of said spring.

2. A latch as defined in claim 1, wherein:
   said luggage case is provided with a handle having a pivot rod extending therefrom into said latch and a mounting member for said latch provided with a slot;
   said base includes a depending hook near one end of said base opposite said pivot means and engaged with said slot of said mounting member;
   said base includes a block at a position below said pivot means and constructed and arranged to receive an attachment device extending through said mounting member; and
   an angle having one leg beneath said block and attached to said member by said attaching device, with the other leg extending upwardly along the end of said block and providing a pivot for said handle rod.

3. A latch as defined in claim 1, wherein:
   said bolt is provided at its lower end with a shoulder extending toward said lock; and
   said lock is rotatable in said base and is provided with an upper lateral abutment, for engaging said bolt shoulder and limiting the upward movement of said bolt and lift lever, said abutment being disposed between said flat sides.

4. A latch as defined in claim 3, wherein:
   said lock is provided with a laterally extending base portion, for engaging said bolt shoulder when in the catch engaging position, said base portion being between said flat sides but opposite said abutment.

5. A latch as defined in claim 1, wherein:
   said end of said spring adjacent said lock is split to permit said spring to be spread laterally when said lock is rotated.

6. A latch as defined in claim 1, wherein:
   said base includes an upstanding portion near one end having a lateral extension at each side provided on the underside with an arcuate surface; and
   said lift lever is provided with a pair of lateral, arcuate flanges engaging said surfaces from beneath, to provide said pivot means.

7. A latch for a luggage case or the like formed as two sections adapted to close together, said latch being mounted upon one section to engage a catch on the other section when the case is closed, and wherein said latch comprises:
   a base secured to said one section and having a longitudinal edge thereof adjacent to the edge of said section;
   transverse pivot means carried by said base;
   a lift lever mounted upon said pivot means to overlie a portion of said base and being adapted to be raised above said base to an upper position and to be lowered toward said base to a lower position;
   a latching bolt carried by said lift lever, depending centrally therefrom towards said base and provided adjacent its lower end with a lateral shoulder, said bolt being adapted to engage said catch when the case is closed and the lift lever is lowered toward said base to its lower position and to be disengaged from said catch when the lift lever is raised;
   a rotatable lock mounted in said base and having an upper abutment, for engaging said bolt shoulder to limit upward movement of said bolt when said lift lever is raised upwardly, and a laterally extending base portion, spaced radially from said abutment, for engaging said bolt shoulder to lock said bolt in catch engaging position;
   a spring mounted between said lift lever and said base;
   mounting means on said base engaging one end of said spring; and
   mounting means on said lift lever engaging the other end of said spring.

8. A pair of latches for a luggage case or the like formed as two sections adapted to close together, said latches being mounted upon one section to engage corresponding catches on the other section when the case is closed, and a handle having a pivot rod extending from each end thereof mounted between said latches, wherein each said latch comprises:
   a base secured to said one section adjacent to the edge of said section;
   movable catch engaging means supported by said base and means for moving said catch engaging means into engaged and disengaged positions;
   said one said section having a mounting member provided with a pair of slots at the respective positions of said latches and adjacent the end of the corresponding latch opposite said handle;
   a hook depending from said base at the end opposite said handle and in engagement with said slot;
   an upstanding block at the end of said base adjacent said handle and having means for receiving a device for attaching said block to said member; and
   an angle concurrently attached to said member by said attaching device and having a leg extending upwardly alongside said block, said upstanding leg of said angle being provided with a hole for pivotally receiving the corresponding pivot rod of said handle.

9. A pair of latches as defined in claim 8, wherein each said latch includes:
   a lift lever pivotally mounted on said base and having a depending, catch engaging bolt; and
   resilient means for holding said lift lever in catch engaged and disengaged positions.

10. A pair of latches as defined in claim 9, wherein:
   said block has a recess adjacent the upper end thereof in which is disposed the portion of said handle rod extending through said upstanding angle leg;
   said block is provided with a lateral extension at each side of said recess provided on the underside with an arcuate surface; and
   said lift lever is provided with a pair of lateral, arcuate flanges pivotally engaging said surfaces from beneath.

(References on following page)

References Cited

UNITED STATES PATENTS

| | | | |
|---|---|---|---|
| 1,707,000 | 3/1929 | Gallagher | 292—128 |
| 2,116,949 | 5/1938 | Long | 292—228 |
| 2,593,570 | 4/1952 | Kirkpatrick | 70—74 |
| 2,672,645 | 3/1954 | Ingram et al. | 16—172 |
| 2,720,772 | 10/1955 | Atkinson | 70—66 |
| 3,103,115 | 9/1963 | Atkinson | 70—71 |

MARVIN A. CHAMPION, *Primary Examiner.*

JOHN R. MOSES, *Assistant Examiner.*